(12) United States Patent
Huang et al.

(10) Patent No.: US 10,513,883 B2
(45) Date of Patent: Dec. 24, 2019

(54) SLAT ANGLE ADJUSTMENT MECHANISM FOR WINDOW BLIND

(71) Applicant: CHING FENG HOME FASHIONS CO., LTD., Changhua County (TW)

(72) Inventors: Chien-Chih Huang, Changhua County (TW); Wei-Ming Shih, Changhua County (TW)

(73) Assignee: CHING FENG HOME FASHIONS CO., LTD., Changhua County (TW)

(*) Notice: Subject to any disclaimer, the term of this patent is extended or adjusted under 35 U.S.C. 154(b) by 0 days.

(21) Appl. No.: 15/807,553

(22) Filed: Nov. 8, 2017

(65) Prior Publication Data

US 2019/0003252 A1  Jan. 3, 2019

(30) Foreign Application Priority Data

Jun. 29, 2017 (TW) .............................. 106209505 U

(51) Int. Cl.
  *E06B 9/322* (2006.01)
  *F16H 1/16* (2006.01)
  *F16D 1/10* (2006.01)

(52) U.S. Cl.
  CPC .............. *E06B 9/322* (2013.01); *F16D 1/101* (2013.01); *F16H 1/16* (2013.01); *F16D 2001/102* (2013.01)

(58) Field of Classification Search
  CPC ..... E06B 9/26; E06B 9/30; E06B 9/32; E06B 9/322; E06B 9/323; E06B 9/327; E06B 2009/3222; E06B 2009/3225; E06B 2009/3227; E06B 2009/285; F16D 1/101; F16D 2001/102
  See application file for complete search history.

(56) References Cited

U.S. PATENT DOCUMENTS

| 4,875,516 A * | 10/1989 | Marocco | E06B 9/307 160/178.1 R |
| 4,955,248 A * | 9/1990 | Lindstrom | E06B 9/32 160/176.1 R |
| 5,092,387 A * | 3/1992 | King | E06B 9/303 160/176.1 R |
| 5,139,072 A * | 8/1992 | Marocco | E06B 9/307 160/176.1 R |

(Continued)

*Primary Examiner* — Jake Cook
*Assistant Examiner* — T. Scott Fix
(74) *Attorney, Agent, or Firm* — Muncy, Geissler, Olds & Lowe, P.C.

(57) ABSTRACT

A slat angle adjustment mechanism for Venetian blind includes a body shell and a transmission unit including a transmission gear set and retractable member. The transmission gear set includes a gear having a position-limiting hole corresponding a second through hole of the body shell, and a screw rod with an extension shank. The retractable member is connected to and movable back and forth along the extension shank of the screw rod. When pulling the retractable member, the retractable member is moved along the extension shank of the screw rod from a first position; when pushing the retractable member, the retractable member is moved along the extension shank of the screw rod from the second position back to the first position. Thus, subject to the retractable characteristic, the slat angle adjustment mechanism prevents damage during packaging.

1 Claim, 6 Drawing Sheets

(56) References Cited

U.S. PATENT DOCUMENTS

| | | | | |
|---|---|---|---|---|
| 5,293,921 | A * | 3/1994 | Marocco | E06B 9/307 160/176.1 R |
| 6,308,764 | B1 * | 10/2001 | Lin | E06B 9/322 160/177 R |
| 6,786,270 | B2 * | 9/2004 | Wen | E06B 9/322 160/170 |
| 8,851,148 | B2 * | 10/2014 | Lin | E06B 9/40 160/168.1 R |
| 8,910,696 | B2 * | 12/2014 | Wen | E06B 9/307 160/177 R |
| 2007/0084567 | A1 * | 4/2007 | Chen | E06B 9/32 160/84.05 |
| 2013/0042985 | A1 * | 2/2013 | Liu | E06B 9/303 160/340 |
| 2015/0300083 | A1 * | 10/2015 | Manske | E06B 9/322 16/429 |
| 2017/0022754 | A1 * | 1/2017 | Nien | E06B 9/307 |

* cited by examiner

SLAT ANGLE ADJUSTMENT MECHANISM FOR WINDOW BLIND

BACKGROUND OF THE INVENTION

1. Field of the Invention

The present invention relates to window blind technology and more particularly, to a slat angle adjustment mechanism for Venetian blind.

2. Description of the Related Art

In conventional Venetian blinds, when the adjustment of the tilting angle of the slats is performed through a slat angle adjustment mechanism that is coupled with the slats. However, the slat angle adjustment mechanisms of conventional Venetian blinds are of a fixed design. During the packaging or delivery of a conventional Venetian blind, the connection part between the slat angle adjustment mechanism and the slats of the Venetian blind can easily be damaged. Therefore, it is desirable to provide a measure that facilitates the convenience of packaging of the Venetian blind slats and the slat angle adjustment mechanism.

SUMMARY OF THE INVENTION

The present invention has been accomplished under the circumstances in view. It is the main object of the present to provide a slat angle adjustment mechanism for Venetian blind slat, which has a retractable characteristic, preventing damage in packaging and facilitating the convenience of packaging.

To achieve this and other objects of the present invention, a slat angle adjustment mechanism for Venetian blind slat comprises a body shell and a transmission unit. The body shell comprises an accommodation chamber, a first through hole and a second through hole. The first through hole is disposed in communication with the accommodation chamber. The second through hole cuts through the body shell and the accommodation chamber, and disposed in communication with the first through hole. The transmission unit is mounted in the accommodation chamber of the body shell, comprising a transmission gear set and a retractable member connected to the transmission gear set. The transmission gear set comprises a gear, and a screw rod engaged with the gear. The gear defines therein a position-limiting hole corresponding to the second through hole of the body shell. The retractable member is connected to the screw rod, comprising an extension shank that is coupled to and alternatively movable back and forth along the extension shank of the screw rod. The retractable member comprises a ring hanger. When pulling the ring hanger of the retractable member, the retractable member is moved along the extension shank of the screw rod from an original first position to a second position. When pushing the ring hanger of the retractable member, the retractable member is moved along the extension shank of the screw rod from the second position back to the first position.

Preferably, the body shell comprises a stop rib radially extended around an inner perimeter of the accommodation chamber and disposed adjacent to the first through hole; the retractable member further comprises a stop flange radially extended around the periphery of one end thereof remote from the ring hanger. When pulling the ring hanger of the retractable member, the retractable member is moved along the extension shank of the screw rod from the first position to the second where the stop flange of the retractable member is stopped at the stop rib of the body shell.

Preferably, the retractable member is a tubular member sleeved onto the extension shank of the screw rod. The extension shank of the screw rod is selectively configured to exhibit a rectangular, crossed shaped, triangular or polygonal cross section. The retractable member defines therein an axial hole. The axial hole is configured to exhibit a cross section fitting the rectangular, crossed shaped, triangular or polygonal cross section of the extension shank of the screw rod.

Preferably, the body shell further comprises a coupling flange disposed adjacent to the screw rod of the transmission gear set. When pushing the ring hanger of the retractable member to move the retractable member along the extension shank of the screw rod from the second position to the first position, the stop flange of the retractable member is stopped at the coupling flange of the body shell.

Other advantages and features of the present invention will be fully understood by reference to the following specification in conjunction with the accompanying drawings, in which like reference signs denote like elements, components, objects, structures, systems, architectures, means, flows, methods or steps.

DETAILED DESCRIPTION OF THE INVENTION

Figure 1:
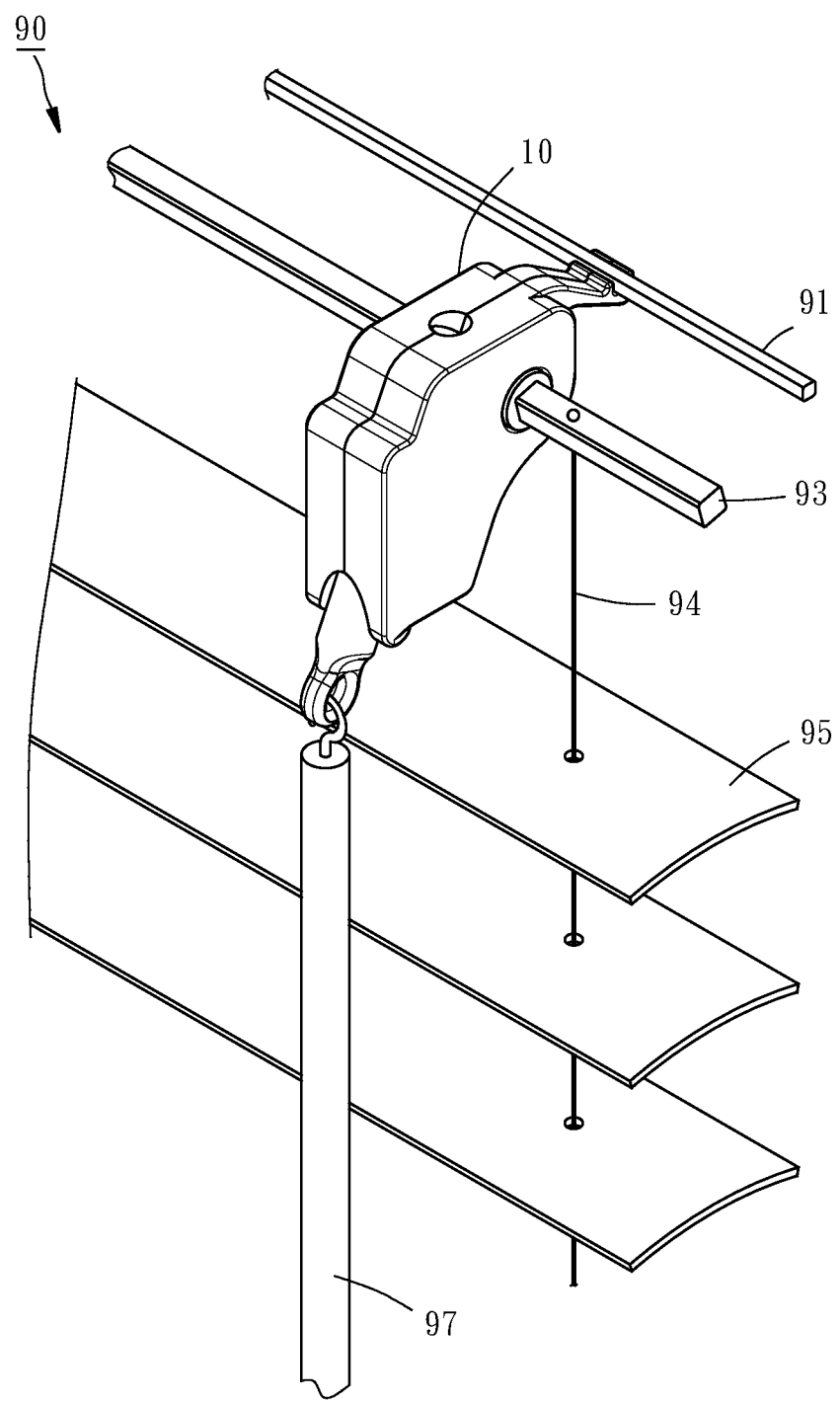
FIG. 1 is a schematic applied view of a slat angle adjustment mechanism in accordance with a first embodiment of the present invention.
Figure 2:
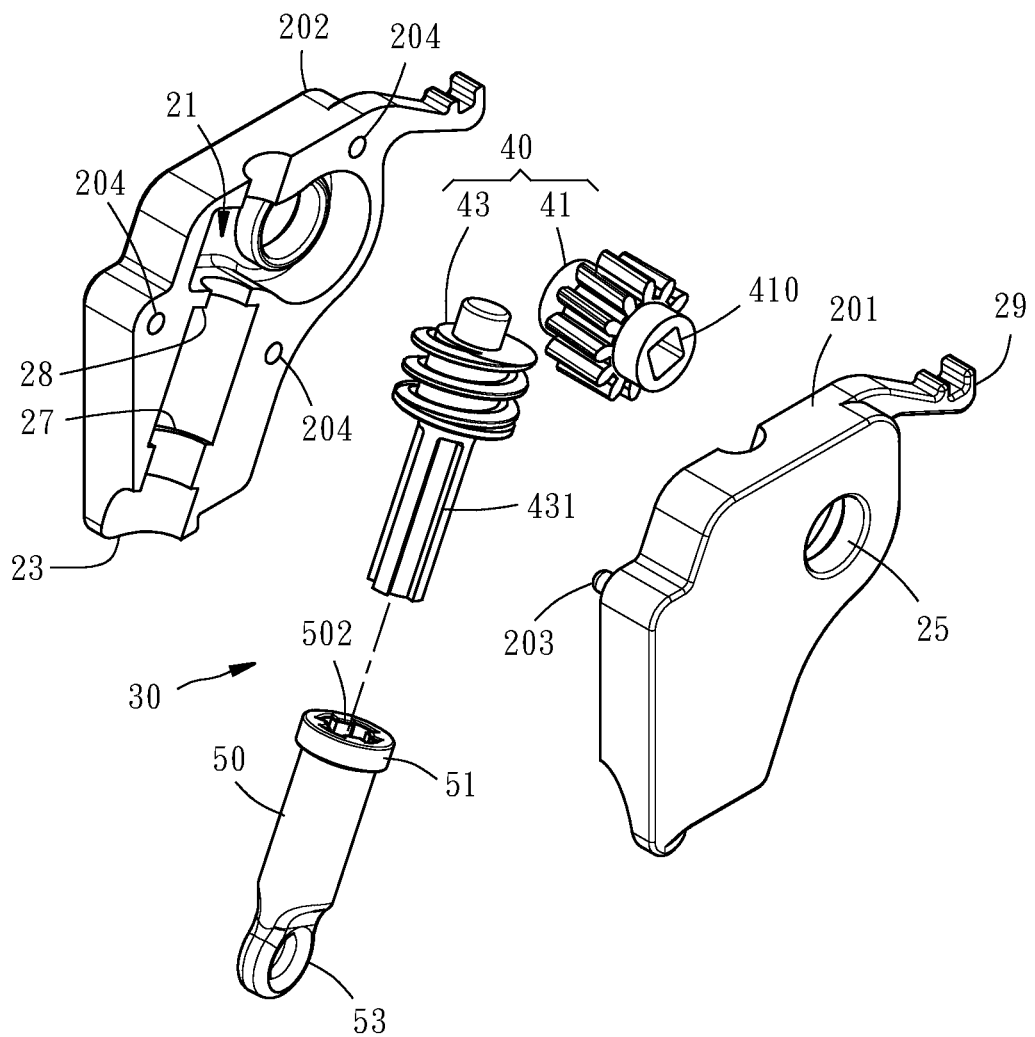
FIG. 2 is an exploded view of the slat angle adjustment mechanism in accordance with the first embodiment of the present invention.
Figure 3:
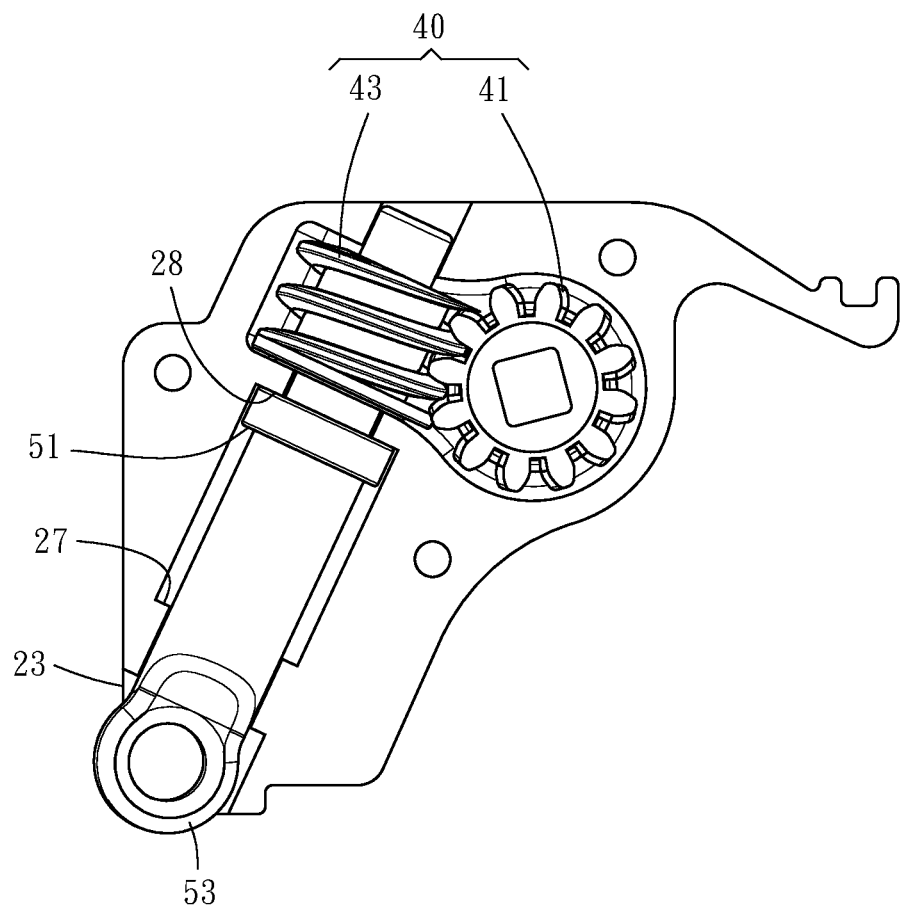
FIG. 3 is a sectional side view of the first embodiment of the present invention, illustrating the retractable member of the slat angle adjustment mechanism in the first position.
Figure 4:
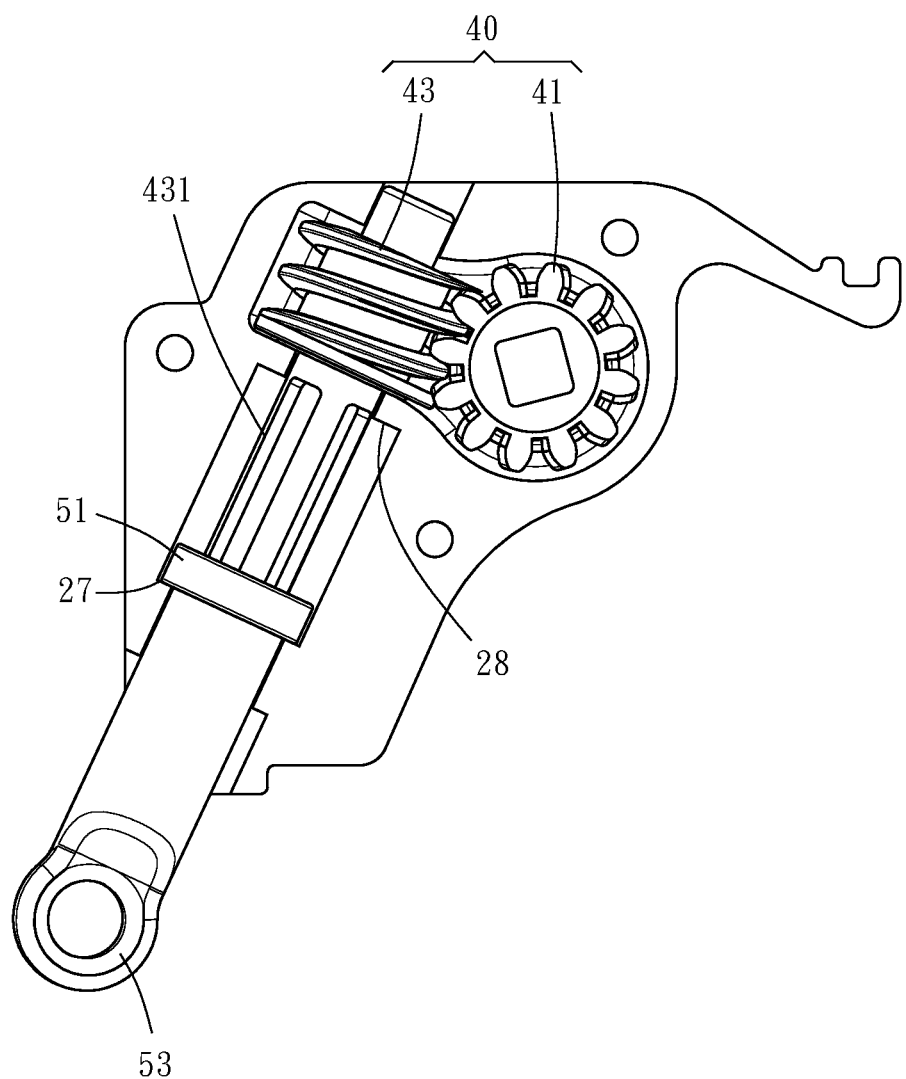
FIG. 4 corresponds to FIG. 3, illustrating the retractable member of the slat angle adjustment mechanism in the second position.

Referring to FIG. 1, a slat angle adjustment mechanism 10 in accordance with a first embodiment of the present invention is shown installed in a Venetian blind 90. The Venetian blind 90 comprises a support member 91, a slat linking member 93, a lift cord 94, a plurality of slats 95 and an adjustment operating member 97. The slat angle adjustment mechanism 10 has one end thereof fixedly fastened to the support member 91. Further, the body of the slat angle adjustment mechanism 10 is affixed to an external wall (not shown) or a window frame (not shown) using a fastening member (not shown). The slat linking member 93 is inserted through the body of the slat angle adjustment mechanism 10, and disposed in parallel to the slats 95. The lift cord 94 has one end thereof connected to one end of the slat linking member 93, and an opposite end thereof vertically downwardly inserted through the slats 95 and then fastened to a bottom side of the slats 95. The adjustment operating member 97 has one end thereof hung on the slat angle adjustment mechanism 10. Thus, when the user rotates the adjustment operating member 97, the slat angle adjustment mechanism 10 is driven to rotate the slat linking member 93, at this time, the lift cord 94 is rolled up or being left off subject to the rotation direction of the slat linking member 93, and the slats 95 are gradually opened or closed to widen or block the window view angle when the lift cord 94 is being rolled up or let off.

Referring to FIGS. 1-4, the slat angle adjustment mechanism 10 comprises a body shell 20 and a transmission unit 30.

The body shell 20 comprises a first shell member 201, a second shell member 202 mating with and fastened to the first shell member 201, and an accommodation chamber 21 defined in between the first shell member 201 and the second shell member 202. Preferably, the first shell member 201 comprises three locating pins 203; the second shell member 202 comprises three locating pin holes 204 respectively disposed corresponding to the locating pins 203. When fastening the first shell member 201 and the second shell member 202 together, press-fit the locating pins 203 of the first shell member 201 into the respective locating pin holes 204 of the second shell member 202.

The body shell 20 further comprises a first through hole 23, a second through hole 25, a stop rib 27, a coupling flange 28 and an engaging portion 29. The first through hole 23 is disposed in communication with the accommodation chamber 21. The second through hole 25 cut through the body shell 20 and the accommodation chamber 21, and disposed in communication with the first through hole 23. Preferably, the extending direction of the first through hole 23 is intersected with the extending direction of the second through hole 25. The stop rib 27 extends around an inner perimeter of the accommodation chamber 21, and is disposed adjacent to the first through hole 23; the coupling flange 28 is radially protruded from the inner perimeter of the accommodation chamber 21, and disposed adjacent to the second through hole 25. The engaging portion 29 has one end thereof connected to the body shell 20 adjacent to the second through hole 25. Further, the engaging portion 29 is adapted for fastening to the support member 91 of the Venetian blind 90.

The transmission unit 30 is accommodated in the accommodation chamber 21 of the body shell 20, comprising a transmission gear set 40 and a retractable member 50 coupled to the transmission gear set 40.

The transmission gear set 40 comprises a gear 41 and a screw rod 43 engaged with the gear 41. The gear 41 defines therein a position-limiting hole 410 corresponding to the second through hole 25 of the body shell 20 for allowing the slat linking member 93 of the Venetian blind 90 to be inserted through the second through hole 25 of the body shell 20 and the position-limiting hole 410 of the gear 41 and position-limited thereto. The screw rod 43 comprises an extension shank 431. It's worth mentioning that the extension shank 431 exhibits a crossed shaped cross section. However, however, this crossed shaped cross section is not a limitation. Alternatively, the extension shank 431 can be selectively configured to exhibit a rectangular, triangular or polygonal cross section.

The retractable member 50 is coupled to the extension shank 431 of the screw rod 43, and can be alternatively moved back and forth along the extension shank 431 of the screw rod 43. The retractable member 50 comprises a stop flange 51 radially extended around the periphery of one end thereof, and a ring hanger 53 located at an opposite end thereof for the hanging of the adjustment operating member 97 of the Venetian blind 90. In this embodiment, the retractable member 50 is a tubular member defining therein an axial hole 502. The cross section of the axial hole 502 is configured to fit the crossed shaped cross section of the extension shank 431 of the screw rod 43. After fitted the axial hole 502 of the retractable member 50 onto the extension shank 431 of the screw rod 43, the retractable member 50 and the screw rod 43 are engaged together.

The aforesaid first embodiment of the present invention achieves the effects as follows:

1. Enable the slat angle adjustment mechanism 10 to provide a retractable characteristic. Referring to FIGS. 1, 3 and 4 again, when the user is going to mounts the slat angle adjustment mechanism 10 at the Venetian blind 90, insert the slat linking member 93 of the Venetian blind 90 through the second through hole 25 of the body shell 20 of the slat angle adjustment mechanism 10 and the position-limiting hole 410 of the gear 41, and then fasten the engaging portion 29 of the slat angle adjustment mechanism 10 the support member 91, and then pull the ring hanger 53 of the retractable member 50 to move the retractable member 50 along the extension shank 431 of the screw rod 43 from a first position to a second position where the ring hanger 53 of the retractable member 50 extends out of the first through hole 23 of the body shell 20 and the stop flange 51 of the retractable member 50 is stopped at the stop rib 27 of the body shell 20, and then hang the adjustment operating member 97 of the Venetian blind 90 on the ring hanger 53 of the retractable member 50. When the user rotates the adjustment operating member 97 of the Venetian blind 90 clockwise or counter-clockwise at this time, subject to the engaged relationship between the axial hole 502 of the retractable member 50 and the extension shank 431 of the screw rod 43, the gear 41 of the transmission gear set 40 is rotated clockwise or counter-clockwise. At this time, the slat linking member 93 of the Venetian blind 90 is driven to rotate in the same clockwise or counter-clockwise direction, causing the slat linking member 93 to roll up or let off the lift cord 94, and thus, the slats 95 are biased clockwise or counter-clockwise by the lift cord 94 subject to the rotary motion of the adjustment operating member 97 of the Venetian blind 90. To this end, the completion of the retractable characteristic of the slat angle adjustment mechanism 10 is done.

2. Improve the convenience of packaging. Referring to FIGS. 1 and 3 again, when the user rotates the adjustment operating member 97 of the Venetian blind 90 again, the slats 95 of the Venetian blind 90 are received subject to the receiving of the lift cord 94. At this time, engagement between the adjustment operating member 97 of the Venetian blind 90 and the retractable member 50 of the slat angle adjustment mechanism 10 can be released. Thereafter, push the ring hanger 53 of the retractable member 50 to move the retractable member 50 along the extension shank 431 of the screw rod 43 from the second position back to the first position where the retractable member 50 is received in the accommodation chamber 21 of the body shell 20 and the ring hanger 53 of the retractable member 50 is partially exposed to the outside of the second through hole 25 of the body shell 20. Thus, the retractable member 50 of the slat angle adjustment mechanism 10 is received in the accommodation chamber 21 of the body shell 20 at this time, the ring hanger 53 of the retractable member 50 of the slat angle adjustment mechanism 10 will not be damaged during packaging. When compared to the prior art techniques, the invention greatly improves the convenience of packaging.

Figure 5:
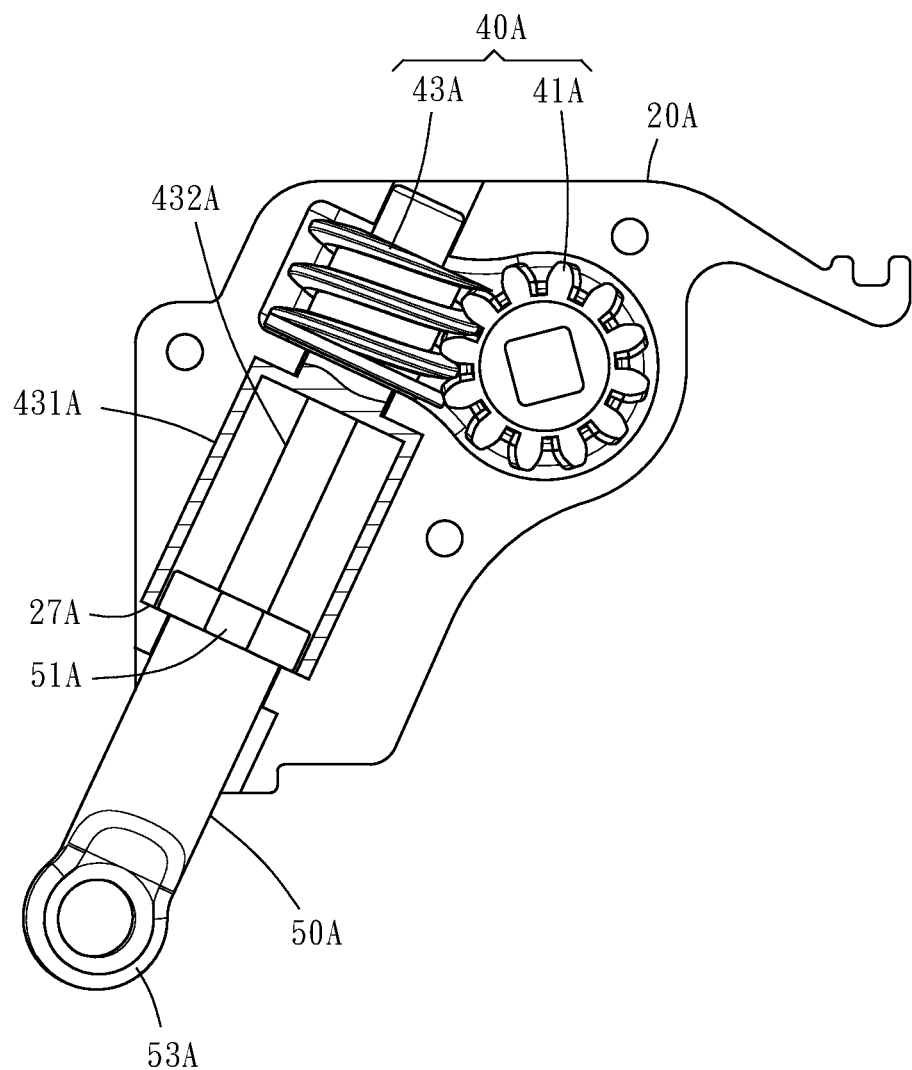
FIG. 5 is a sectional side view of a slat angle adjustment mechanism in accordance with a second embodiment of the present invention.

Referring to FIG. 5, a slat angle adjustment mechanism for Venetian blind in accordance with a second embodiment of the present invention is shown. This second embodiment is substantially similar to the aforesaid first embodiment with the exceptions as described hereinafter.

The gear 41A of the transmission gear set 40A with the screw rod 43A; the extension shank 431A of the screw rod 43A is a tubular member; the inner perimeter 432A of the extension shank 431A exhibits a crossed shaped cross section, or selectively a rectangular, triangular or polygonal cross section; the cross section of the stop flange 51A of the retractable member 50A mates with the crossed shaped cross section of the inner perimeter 432A of the extension shank 431A of the screw rod 43A; the retractable member 50A is inserted through the extension shank 431A of the screw rod 43A.

When the extension shank 431A of the screw rod 43A is sleeved onto the retractable member 50A, the screw rod 43A and the retractable member 50A are engaged together, and the retractable member 50A can be alternatively moved back and forth along the extension shank 431A of the screw rod 43A. Preferably, when pulling the ring hanger 53A of the retractable member 50A to move the retractable member 50A along the extension shank 431A of the screw rod 43A from the original first position to the second position, the stop flange 51A of the retractable member 50A is stopped at the stop rib 27A of the body shell 20A. Thus, the slat angle adjustment mechanism has the retractable characteristic.

Figure 6:
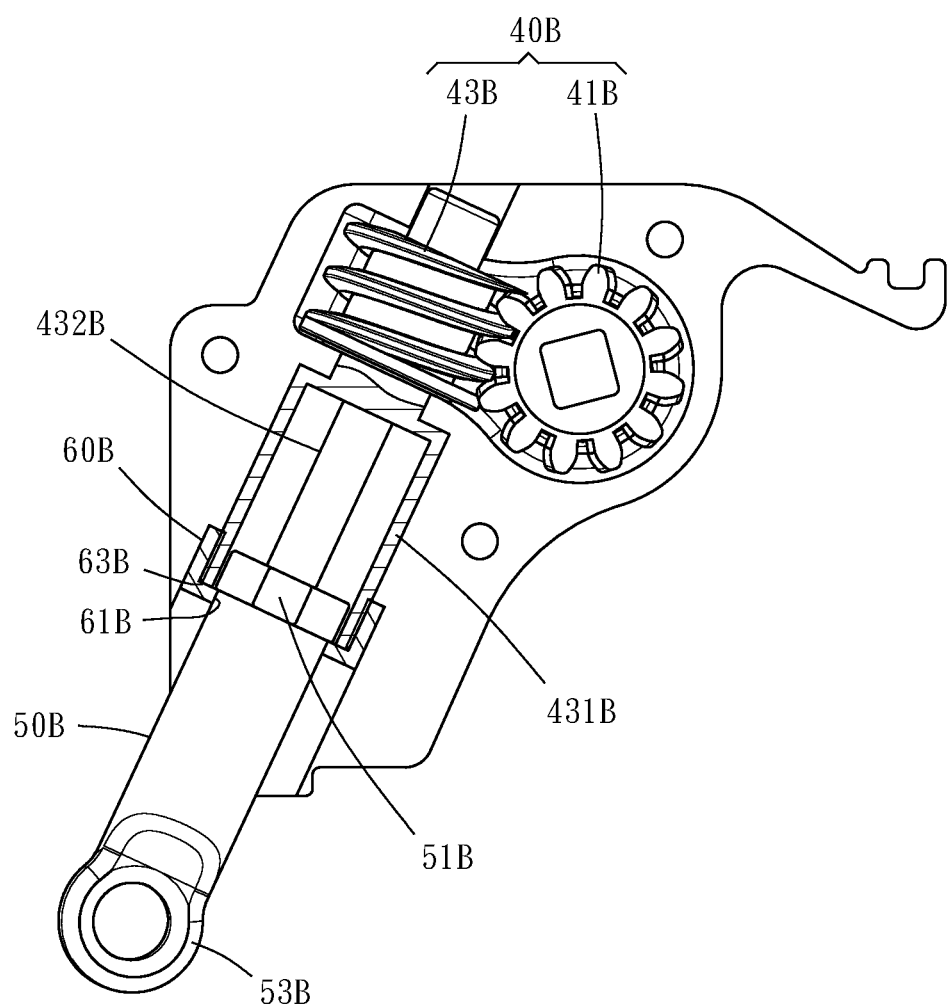
FIG. 6 is a sectional side view of a slat angle adjustment mechanism in accordance with a third embodiment of the present invention.

Referring to FIG. 6, a slat angle adjustment mechanism for Venetian blind in accordance with a third embodiment of the present invention is shown. This third embodiment is substantially similar to the aforesaid second embodiment with the exceptions as described hereinafter.

The slat angle adjustment mechanism further comprises a screw nut 60B threaded onto the extension shank 431B of the screw rod 43B of the transmission gear set 40B. The screw nut 60B defines therein a center through hole 61B.

Similarly, the gear 41B of the transmission gear set 40B is engaged with the screw rod 43B; the extension shank 431B of the screw rod 43B is a tubular member; the inner perimeter 432B of the extension shank 431B exhibits a crossed shaped cross section, or selectively a rectangular, triangular or polygonal cross section; the cross section of the stop flange 51B of the retractable member 50B mates with the crossed shaped cross section of the inner perimeter 432B of the extension shank 431B. Preferably, the outer diameter of the stop flange 51B of the retractable member 50B is greater than the aperture of the center through hole 61B of the screw nut 60B.

In installation, insert the ring hanger 53B of the retractable member 50B through the center through hole 61B of the screw nut 60B, and then thread the screw nut 60B onto the extension shank 431B of the screw rod 43B of the transmission gear set 40B. At this time, the extension shank 431B of the screw rod 43B is sleeved onto the stop flange 51B of the retractable member 50B, causing the screw rod 43B and the retractable member 50B to be engaged together and allowing the retractable member 50B to be alternatively moved back and forth along the inner perimeter 432B of the extension shank 431B of the screw rod 43B. When pulls the ring hanger 53B of the retractable member 50B to move the retractable member 50B along the extension shank 431B of the screw rod 43B from the original first position to the second position, subject to the relationship that the outer diameter of the stop flange 51B of the retractable member 50B is larger than the aperture of the center through hole 61B of the screw nut 60B, the stop flange 51B of the retractable member 50B is stopped at a bottom edge 63B of the screw nut 60B. Thus, the slat angle adjustment mechanism has the retractable characteristic.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A slat angle adjustment mechanism for window blind assembly, comprising:

a body shell comprising an accommodation chamber, a first through hole, a second through hole, a stop rib and a coupling flange, said first through hole being disposed in communication with said accommodation chamber, said second through hole cut through said body shell and said accommodation chamber and disposed in communication with said first through hole, said stop rib being radially extended around an inner perimeter of said accommodation chamber and disposed adjacent to said first through hole, said coupling flange extending radially inwardly around an inner perimeter of said accommodation chamber; and a transmission unit mounted in said accommodation chamber of said body shell, said transmission unit comprising a transmission gear set and a retractable member connected to said transmission gear set, said transmission gear set comprising a gear and a screw rod engaged with said gear, said gear defining therein a position-limiting hole corresponding to the said second through hole of said body shell, said retractable member being connected to said screw rod, said coupling flange of said body shell being disposed adjacent to said screw rod of said transmission gear set, said screw rod comprising an extension shank, said retractable member is socketed into said extension shank of said screw rod and alternatively movable back and forth along a same axial direction with said extension shank of said screw rod, a top end of said screw rod being fixedly mounted to a top end of said accommodation chamber of said body shell and near said second through hole, said retractable member comprising a stop flange and a ring hanger, said stop flange being radially extended around the periphery of one end thereof remote from said ring hanger, and an adjustment operating member being provided with a hook detachably hung on the ring hanger of said retractable member, wherein said retractable member is a tubular member sleeved onto said extension shank of said screw rod, wherein said extension shank of said screw rod is selectively configured to exhibit a rectangular, crossed shaped, triangular or polygonal cross section, wherein said retractable member defines therein an axial hole, said axial hole being configured to exhibit a cross section fitting the rectangular, crossed shaped, triangular or polygonal cross section of said extension shank of said screw rod, and wherein when pulling said ring hanger of said retractable member, said retractable member is moved along said extension shank of said screw rod from an original first position to a second position where said stop flange of said retractable member is stopped at said stop rib of said body shell; when pushing said ring hanger of said retractable member, said retractable member is moved along said extension shank of said screw rod from said second position back to said first position where said stop flange of said retractable member is stopped at said coupling flange of said body shell.

* * * * *